(12) United States Patent
Ciudaj

(10) Patent No.: US 8,381,437 B2
(45) Date of Patent: Feb. 26, 2013

(54) IRRIGATION DEVICE AND METHOD OF PROMOTING DEEP ROOT GROWTH OF A PLANT

(75) Inventor: Jeffrey Ciudaj, Angwin, CA (US)

(73) Assignees: Marc E. Hankin, Los Angeles, CA (US); Jeffrey Ciudaj, Angwin, CA (US)

( * ) Notice: Subject to any disclaimer, the term of this patent is extended or adjusted under 35 U.S.C. 154(b) by 161 days.

(21) Appl. No.: 13/046,340

(22) Filed: Mar. 11, 2011

(65) Prior Publication Data

US 2011/0219684 A1 Sep. 15, 2011

Related U.S. Application Data

(60) Provisional application No. 61/313,673, filed on Mar. 12, 2010.

(51) Int. Cl.
*A01G 29/00* (2006.01)
(52) U.S. Cl. .......................................... 47/48.5
(58) Field of Classification Search ............... 47/4.5, 47/59 R, 79, 80; 405/43, 45
See application file for complete search history.

(56) References Cited

U.S. PATENT DOCUMENTS

| | | | | |
|---|---|---|---|---|
| 587,779 A * | 8/1897 | Barker | ............ | 166/278 |
| 1,280,486 A * | 10/1918 | Kanst | ............ | 47/48.5 |
| 2,083,153 A * | 6/1937 | Irish | ............ | 111/7.1 |
| 2,127,175 A * | 8/1938 | Imbertson et al. | ....... | 47/58.1 R |
| 2,790,403 A * | 4/1957 | Larsen | ............ | 111/7.1 |
| 3,587,972 A | 6/1971 | Weeth | | |
| 3,672,571 A * | 6/1972 | Goodricke | ............ | 239/145 |
| 3,900,962 A * | 8/1975 | Chan | ............ | 47/48.5 |
| 4,162,041 A * | 7/1979 | Hane | ............ | 239/266 |
| 4,453,343 A | 6/1984 | Grimes et al. | | |
| 5,310,281 A | 5/1994 | Elena | | |
| 5,694,716 A * | 12/1997 | Bible | ............ | 47/48.5 |
| 5,761,846 A * | 6/1998 | Marz | ............ | 47/48.5 |
| 5,938,372 A | 8/1999 | Lichfield | | |
| 5,975,797 A | 11/1999 | Thomas et al. | | |
| 5,996,279 A | 12/1999 | Zayeratabat | | |
| 6,260,769 B1 * | 7/2001 | Hoover | ............ | 239/145 |
| 6,394,368 B1 * | 5/2002 | Hintz | ............ | 239/542 |
| 6,443,367 B1 | 9/2002 | Bova | | |
| 6,540,436 B2 | 4/2003 | Ogi | | |
| 7,225,585 B2 | 6/2007 | Zayeratabat | | |
| 2003/0196375 A1 | 10/2003 | Ferro | | |
| 2008/0005960 A1 | 1/2008 | King | | |

* cited by examiner

*Primary Examiner* — R. P. Swiatek
*Assistant Examiner* — Ebony Evans
(74) *Attorney, Agent, or Firm* — Marc E. Hankin; Kevin Schraven; Hankin Patent Law, APC

(57) ABSTRACT

The invention is a device and method for providing irrigation water to a plant that promotes the growth of the roots of the plant deep into the soil. The invention includes a tube, connector, and soaker hose that is buried next to a plant. The invention connects to an existing irrigation drip line system that previously provided water to the plant. The invention also repels the roots of the plant away from the apparatus so that the roots are hindered from destroying the apparatus.

3 Claims, 3 Drawing Sheets

IRRIGATION DEVICE AND METHOD OF PROMOTING DEEP ROOT GROWTH OF A PLANT

CROSS REFERENCE TO RELATED APPLICATIONS

This Application claims priority to U.S. Provisional Patent Application No. 61/313,673, titled "Deep Root Watering Device and Method" filed on Mar. 12, 2010 by Jeffrey Ciudaj, the contents of which is hereby expressly incorporated in its entirety by this reference.

FIELD OF INVENTION

The invention is a device and method for promoting the downward growth of the roots of a plant. More particularly, the invention relates to a device and method that provides deep root watering of a plant and promotes the growth of the roots of a plant deeper into the ground. The invention is connectable to an existing irrigation drip line system. The invention can also repel the roots of the plant away from the apparatus so that the strengthened roots are hindered from destroying the apparatus.

BACKGROUND

For thousands of years farmers and, more specifically, viticulturists, have irrigated plants and vines to provide for a controlled and consistent growth in the face of inconsistent weather patterns. More recently, farmers have adopted a system of drip irrigation that allows each and every vine in a field to be individually watered efficiently without water wasting sprinklers. However, this drip irrigation system provides water only on the top of the soil and the water does not penetrate deep into the soil. This causes the roots of the vines or plants to stay near the surface of the soil, instead of having the roots burrow down into the soil, as is preferred for a healthy and hardy plant. When a vine or plant has deep roots, the plant is better able to find its own supply of water in the lower water table and survive harsh weather conditions, such as extreme cold, extreme heat, or drought.

Several references attempt to overcome the problems with drip irrigation by providing an underground source of irrigation water to the plants. One type of underground irrigation system includes references that disclose ways to regulate water. U.S. Pat. Nos. 4,453,343, issued to Grimes, 6,540,436, issued to Ogi, and 5,938,372, issued to Lichfield, are three such references. Other reference disclose irrigation systems that define types of holes, like U.S. Pat. No. 6,443,367, issued to Bova (which has a screw top hole), U.S. Published Patent Application No. 2003/0196375, filed by Ferro (which discloses multiple holes), and U.S. Pat. No. 5,996,279, issued to Zayeratabat (which discloses holes with a closeable lid).

These references, which share some common features, disclose irrigation systems that attempt to provide deep root irrigation water to a plant. However, these references do not solve all of the problems of the standard drip irrigation system, and importantly, none of these references disclose a solution that can take advantage of an existing drip irrigation system by directly connecting to the existing drip irrigation system. Thus, what is needed an efficient deep root irrigation system that can connect to the existing drip irrigation system that was previously installed.

SUMMARY OF THE INVENTION

To minimize the limitations in the prior art, and to minimize other limitations that will become apparent upon reading and understanding the present specification, the present invention is a device and method for providing irrigation water to a plant that encourages the development of deep root growth and that is connectable to the existing drip irrigation system.

An irrigation device may comprise: a tube; a coupling; and a hose. The coupling may connect the hose to the tube and the tube may connect to a water source. The irrigation device may be buried underground such that the tube is partially above ground and partially below ground, and the coupling and the soaker hose are below ground. Preferably, the water source is an existing irrigation drip line emitter and the hose is a soaker hose. The irrigation device is preferably buried next to a plant such that one or more roots of the plant grow downward towards a buried portion of the irrigation device, specifically the soaker hose. The buried portion of the tube may extend downward in a substantially vertical manner such that the coupling is initially below the one or more roots of the plant (of course the roots may always later grow lower than the coupling); and wherein the soaker hose extends upward in a substantially vertical manner from the coupling towards the one or more roots. Preferably, the coupling is comprised of copper. The irrigation device may be placed underground by digging a hole, placing the irrigation device in the hole, and backfilling the hole with an aerating composition, such as gravel and/or sand. The hole is preferably substantially vertical.

Another embodiment of the invention is an irrigation device that may comprise: a tube; a copper coupling; and a soaker hose. The copper coupling may connect the soaker hose to the tube. The tube may connect to an existing drip irrigation water source. The irrigation device may be buried underground such that the tube is partially above ground and partially below ground, and wherein the copper coupling and the soaker hose may be below ground. Preferably the irrigation device is buried next to a plant such that when water is passed through the irrigation device one or more roots of the plant are caused to grow downward towards a buried portion of the irrigation device. An underground portion of the tube may extend downward in a substantially vertical manner such that the copper coupling is below one or more roots of a plant and the soaker hose extends upward from the copper coupling towards the one or more roots in a substantially vertical manner. Preferably, the irrigation device is placed underground by digging a hole, placing the irrigation device in the hole, and backfilling the hole with sand and gravel. Typically, the hole is substantially vertical.

Another embodiment of the invention is a method of promoting deep root growth of a plant may comprise the steps of: providing an irrigation device; wherein the irrigation device is comprised of: a tube; a copper coupling; and a soaker hose; wherein the copper coupling connects the soaker hose to the tube; connecting the irrigation device to a water source; burying the irrigation device underground such that the tube is partially above ground and partially below ground, and wherein the copper coupling and the soaker hose are below ground; and passing a flow of water through the irrigation device. Preferably the water source is an existing drip irrigation system. The irrigation device may be buried by digging a hole, placing the irrigation device in the hole, and backfilling the hole with an aerating composition. The irrigation device may be buried next to a plant such that when the flow of water is passed through the irrigation device one or more roots of the plant are caused to grow downward towards a buried portion of the irrigation device. Preferably, an underground portion of the tube extends downward in the backfilled hole in a substantially vertical manner. The copper coupling is placed in a low point of the hole and is below the one or more roots of the plant and the soaker hose extends upward from the copper coupling towards the one or more roots in a substantially vertical manner. The copper coupling repels the one or more roots and hinders the one or more roots from destroying the irrigation device.

Another embodiment of the invention may be comprised of an irrigation tube, which may be attached to a drip emitter, a coupling, and a soaker hose (or perforated tube). The irrigation tube may be buried to a point that is substantially below the roots of a plant with the coupling at the lowest point. The soaker hose may be located directed above the coupling and directed upwardly towards the roots of the plant. The water from the soaker hose, which is preferably just within reach of the roots, encourages the growth of the roots of the plant downward and deeper.

Another embodiment of the invention may comprise a plant watering apparatus with a tube; a coupling; and a soaker hose. The tube may be connected to one end of the coupling. The soaker hose may be connected to another end of the coupling. The tube and the soaker hose may not be connected to the same end of the coupling. The tube may also be connected to an existing irrigation drip line emitter. The connection between the tube and the existing irrigation drip line emitter may not be the same connection as the tube and the coupling connection. The plant watering apparatus may also comprise a hole; wherein the tube may be placed inside the hole. The hole may be adjacent to a plant to be watered. The hole may also or alternatively be underneath the plant. The coupling may be placed in a lowest position in the hole and the soaker hose may be placed above the coupling and towards a plurality of roots of the plant to be watered. The hole may be back-filled with gravel or sand to provide additional aeration of the soil. The coupling may be copper. The soaker hose may create a higher density area of moist soil at a deeper soil level than a surface-level irrigation drip line alone.

Another embodiment of the invention is a method of promoting deep root growth of a plant that may comprise the steps of: providing a watering apparatus; connecting the watering apparatus to an existing drip line emitter; placing the watering apparatus in a hole, wherein the hole is adjacent to a plant to be watered; and providing water to the existing drip line emitter, wherein the water flows through the watering apparatus and waters the plant. The method may further provide a watering apparatus that comprises a tube, a coupling, and a soaker hose; placing the coupling at a low point in the hole; placing the soaker hose above the coupling and toward a plurality of roots of the plant to be watered; and providing water to the existing drip line emitter, wherein the water flows to the soaker hose through the tube and the coupling.

The method may further comprise: back-filling the hole with gravel or sand to provide additional aeration of the soil. Additionally, the method may repel a plurality of roots away from the coupling because the coupling is constructed of copper.

Another embodiment of the invention is a method of promoting deep root growth of a plant that may comprise the steps of: providing a watering apparatus that is comprised of a tube, a coupling, and a soaker hose; connecting the tube to an existing drip line emitter; placing the watering apparatus in a hole, wherein the hole is adjacent to a plant to be watered; placing the coupling at a low point in the hole; placing the soaker hose above the coupling and toward a plurality of roots of the plant to be watered; and providing water to the existing drip line emitter, wherein the water flows to the soaker hose through the tube and the coupling. The hole may be adjacent to or underneath a plant to be watered.

It is an object of this invention to provide a methods and device for encouraging the growth of plants roots in a downward direction deeper into the soil.

It is another object of this invention to incorporate the existing irrigation system with the watering apparatus device and/or enhanced watering method.

It is yet another object of the present invention to overcome the limitations of the prior art.

DETAILED DESCRIPTION OF THE DRAWING

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

Although one specific embodiment is disclosed, still other embodiments of the present invention will become apparent to those skilled in the art from the following detailed description, which shows and describes only one illustrative embodiment of the invention. As will be realized, the invention is capable of modifications in various obvious aspects, all without departing from the spirit and scope of the present invention. Accordingly, this one figure is to be regarded as merely illustrative in nature and not restrictive. Also, the reference or non-reference to a particular embodiment of the invention shall not be interpreted to limit the scope of the invention.

Figure 1:
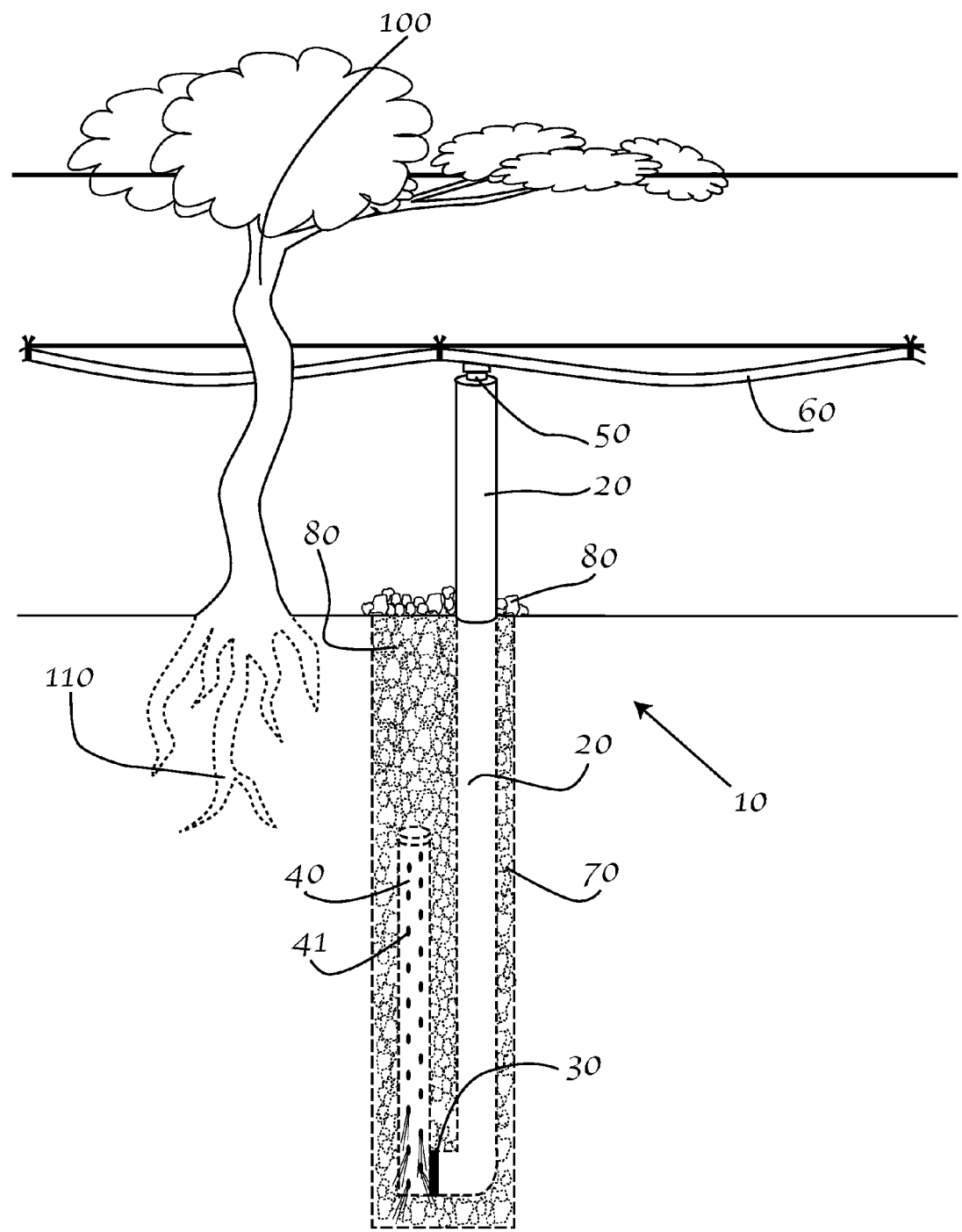
FIG. 1 is an illustration of one embodiment of the irrigation device.

FIG. 1 is an illustration of one embodiment of the irrigation device. As shown in FIG. 1, the irrigation device 10 preferably includes a tube 20, a coupling 30, and a hose 40. The tube 20 and hose 40 are preferably connected to the ends of the coupling 30. The tube 20 is preferably connected to an existing irrigation drip line emitter 50 and hose 40 is preferably a soaker hose. It should be understood that the invention may be combined with any source of water or other nutrient providing system without deviating from the scope of the invention.

As shown in FIG. 1, the tube 20 extends from a source of water, which is above ground, and continues underground in a substantially vertical manner. When the irrigation system is turned on, water travels from the existing irrigation drip line emitter 50 passing through any valves, if needed, which may regulate the water flow between the irrigation drip line 60 and the tube 20. The valve may also prevent the back flow of water. The tube 20 may be constructed from an natural or man-made material, including, but not limited to High-Density Polyethylene ("HDPE"), Medium-Density Polyethylene ("MDPE"), copper, iron, or lead pipes, thermoplastic polymers like Polyvinyl chloride ("PVC"), Chlorinated polyvinyl chloride ("CPVC"), Acrylonitrile butadiene styrene ("ABS"), cross-linked polyethylene ("PEX plastic") pressure pipes, or any other similar material that can help to resist mold, corrosion, and weather damage. Although tube 20 is shown as wider than irrigation drip line 60, it is preferably a flexible tube that is narrower than the irrigation line. If desired, a pressure control valve may also be installed to regulate water pressure and help prevent excessive pressure from harming the system.

The irrigation device 10 is assembled and then placed in the hole 70, which, as shown in FIG. 1 is a deep and substantially vertical hole that can accommodate the length of the hose 30. FIG. 1 also shows how the irrigation device 10 is preferably buried low enough so that roots will strive to get to the water provided.

The coupling 30 is preferably copper and, as shown in FIG. 1, is at a low point in the hole 70. In addition to repelling roots, the copper coupling 30 also acts as a catalyst in photosynthesis and respiration. By incorporating a copper coupling 30 into the hole 70, roots 110 of the plant that the irrigation device 10 is watering will be prevented from growing. Preferably, the copper coupling 30, which is between the tube 20 and the hose 40, will also repel the roots 110 from destroying the tube 20 or clogging the water supply running though tube 20. Preferably, the copper coupling 30 is standard dual sided hose coupling that extends into tube 20 and oppositely into hose 40. Coupling 30 may be any shape, such a U-bend, V-bend, ninety (90) degree bend, or straight, without deviating from the scope of the invention.

The hose 40, which is preferably soaker hose, or other type of perforated tube that has small holes 41 which allows water to seep out of the hose 40 as it travels up the length of the hose 40. Specifically, the water percolates upward in hose 40 towards the roots 110. Preferably, hose 40 has a cap at the end that forces water to exit out of the holes 41. However, the hose 40 may simply be tied off, sealed, crimped, or otherwise plugged, to prevent the water from exiting out the end of the tube 40. The water will first exit the hose 40 out of holes 41 that are closest to coupling 30. As such, depending upon how much water is provided to the irrigation device, more water will be provided at a lower level in the hole 70. Thus, when less water is provided, the water is provided deeper, which causes the roots to strive to grow deeper. But, when the irrigation device 10 is first installed, more water can be provided so that the roots 110 sense the water and start growing deeper immediately. A column of saturated soil is created along the hose 40, which allows the roots 110 to grow downward to and through the saturated soil and into the soaker hose. Preferably, the saturated column of soil never reaches the surface of the soil. Thus, there is no loss of water to evaporation.

FIG. 1 also shows that the plant watering apparatus 10 is placed in a hole 70, which is adjacent to a plant 100 to be watered. Preferably, the coupling 30 placed in a lowest position in the hole 70 and the hose 40 is placed above the coupling 30, stretching vertically upward towards the roots 110 of the plant 100 to be watered. The hole 70 is back typically back filed with an aerating composition 80, such as gravel or sand to provide additional aeration of the soil. The hole 70 may be backfilled with any composition without deviating from the scope of the invention, so long as the irrigation device is held in place and may provide water to plant 100.

When the irrigation device 10 is used, a moist layer of soil is created that is substantially deeper than what can be created by a standard drip irrigation system or sprinkler system. By creating deeper roots 110, the plant 100 can better survive harsh weather, such as extreme heat, cold, unseasonable weather, drought, or excessive rainfall. Plants without deep roots are much less likely to survive harsh weather.

Figure 2:
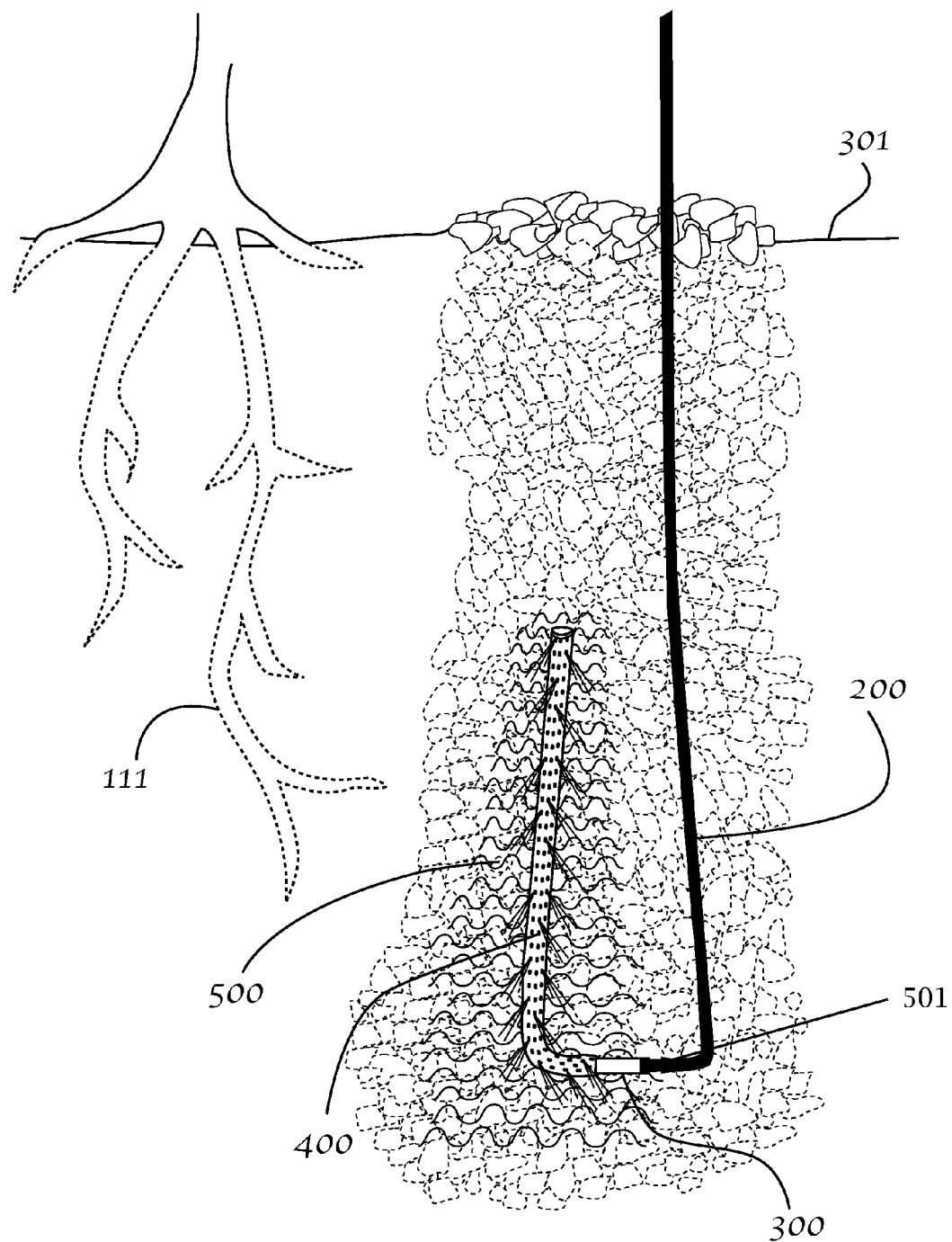
FIG. 2 is an illustration of one embodiment of the irrigation device and shows the copper coupling inserting into the tube and the hose.

FIG. 2 is an illustration of one embodiment of the irrigation device and shows the copper coupling inserting into the tube and the hose. As shown in FIG. 2, the irrigation device 100 preferably includes a tube 200, a coupling 300, and a hose 400. The coupling 300 is preferably inserted into tube 200 and hose 400, thus joining tube 200 and hose 400. Although FIG. 2 shows that the coupling 300 is at the bottom of the hole and is parallel to the surface of the ground 301, it should be understood that the coupling 300 is preferably perpendicular to the ground 301 and the tube 200 has a U-shaped bend, which is at the bottom of the hole. This U-shaped bend may be from the manufactured curve of the tube or the tube may be kept in a U-shaped bend by a small clip or twist-tie. FIG. 2 shows how the hose 400 is a soaker hose that has a plurality of perforations that allow water to seep out into the ground surrounding the hose 400. This creates a column of water saturated soil 500 that the adjacent roots 111 grow toward. FIG. 2 shows how the water saturated soil 500 is preferably wider at lower depths. This promotes the deep growth of the roots. FIG. 2 also shows how tube 200 and hose 400 are relatively thin and do not displace a significant amount of soil, but still allow a steady stream of water to reach the soil. As shown in FIG. 2, the irrigation device may also include a connector 501 that connects the tube 200 to the coupling 300.

Figure 3:
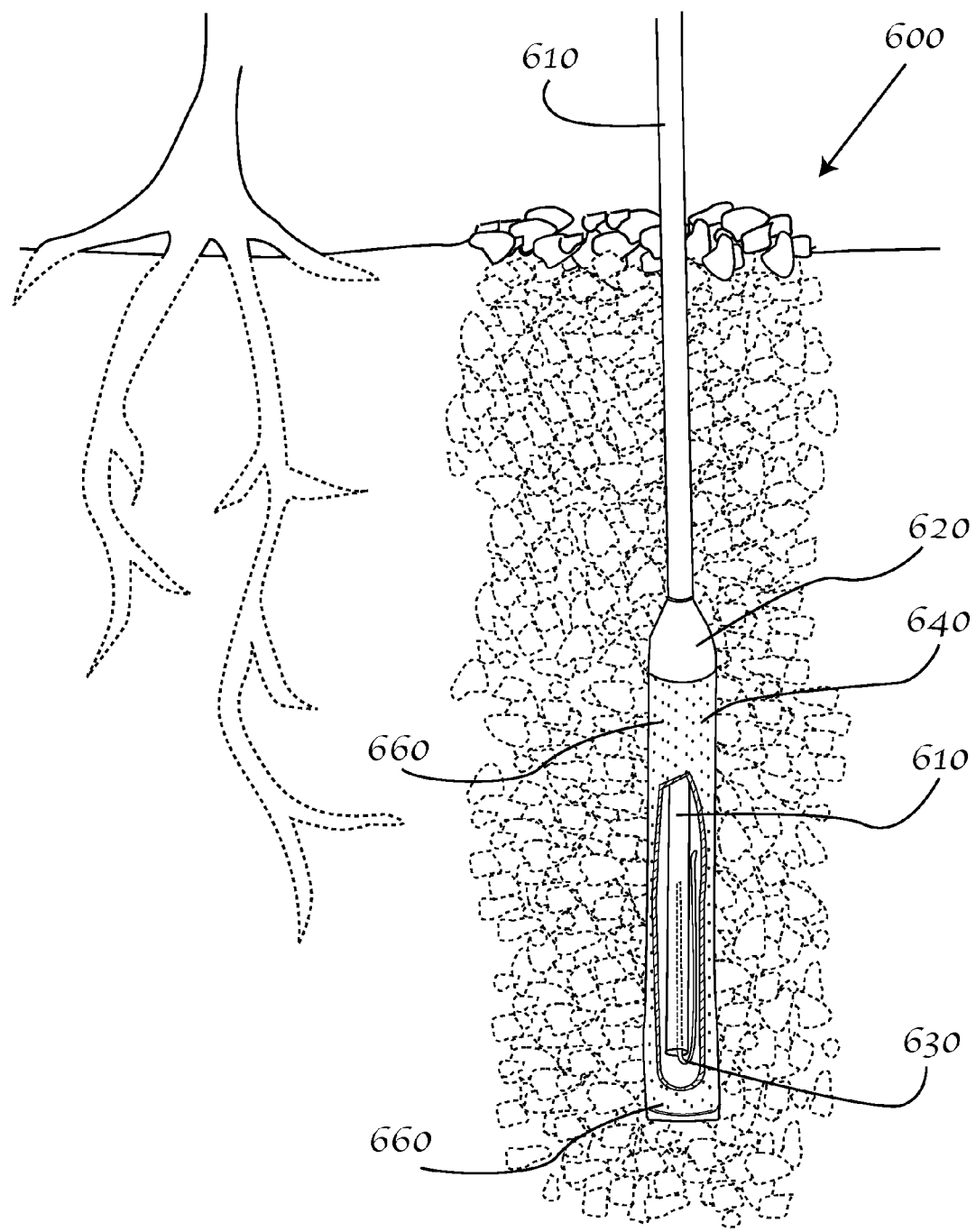
FIG. 3 is an illustration of one embodiment of the irrigation device and shows the tube inside the hose.

FIG. 3 is an illustration of one embodiment of the irrigation device and shows the tube inside the hose. As shown in FIG. 3, the irrigation device 600 preferably includes a tube 610, a copper device 630, and a hose 640. As shown in FIG. 3, the copper device 630 is inserted into an end of tube 610. This copper device 630 and end of tube 610 are inserted substantially inside the hose 640. FIG. 3 shows how there is preferably space between the copper device 630 with end of tube 610 and the base or bottom of hose 640. FIG. 3 also shows how the copper device 630 preferably is U-shaped or bent so that some of the copper device 630 is inside tube 610 and some of the copper device 630 is outside tube 610. The copper device 630 prevents organic matter from growing into tube 610 and blocking the flow of water that runs from an irrigation system into tube 610, past copper device 630, into hose 640 and out of hose 640 through numerous pores or perforations 660 in hose 640. Hose 640 is preferably a soaker hose. Perforations 660 allow water to seep out into the ground surrounding the hose 610. This creates a column of water saturated soil that the adjacent roots 670 grow down and toward. As shown in FIG. 3, the irrigation device may also include a connector 620 such as electrical tape, glue, or heated plastic that connects the upper end of the hose 660 over an outer portion of the tube 610. However, any type of connector, adhesive, or fastener can be used without deviating from the scope of the invention. The copper device 630 is preferably a small portion of copper wire, as shown in FIG. 3, but it may be any device made of copper that will fit into the end of tube 610, yet not block the water from exiting tube 610. Although only a portion of the copper device 630 is shown within an interior of the tube 610, it should be understood that all or none of the copper device may be within the tube 610. FIG. 3 shows that irrigation device 600 is preferably substantially underground, with a portion of the tube 610 above ground to connect to an irrigation system. The irrigation system may be installed at the same time as the irrigation device 600, but it is preferably an existing system. The lower end of the hose 640 is preferably pressed, sealed, or crimped. This is preferably accomplished by a heat press device, but any other sealing device may be used without deviating from the scope of the invention.

The foregoing description of the preferred embodiment of the invention has been presented for the purposes of illustration and description. Although only one embodiment is shown in the figure, still other embodiments of the present invention will become apparent to those skilled in the art from the above detailed description of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. An irrigation device comprising:
    an irrigation device,
    wherein said irrigation device is comprised of: a tube; a copper device; and a hose;
    wherein said tube has a lower end and an upper end;
    wherein at least a portion of said copper device is placed within an interior of said lower end of said tube;
    wherein said lower end of said tube and said copper device are substantially within said hose and said upper end is outside of said hose; and
    wherein said irrigation device is buried under ground such that said tube is partially above said ground and partially below said ground, and wherein said copper device and said hose are below said ground.

2. The irrigation device of claim 1, wherein said upper end of said tube is connected to an existing drip irrigation water source;
    wherein said hose is comprised of a plurality of perforations;
    wherein a lower end of said hose is sealed such that when a liquid is passed through said irrigation device, said liquid passes through said plurality of perforations of said hose.

3. The irrigation device of claim 2, wherein said irrigation device is further comprised of a connector;
    wherein said connector connects an upper end of said hose to an exterior of said tube.

* * * * *